(12) United States Patent
Seo et al.

(10) Patent No.: US 10,477,492 B2
(45) Date of Patent: Nov. 12, 2019

(54) METHOD FOR TRANSMITTING SIGNAL ON BASIS OF MULTI-RADIO ACCESS TECHNOLOGY IN WIRELESS COMMUNICATION SYSTEM AND APPARATUS THEREFOR

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/075,117

(22) PCT Filed: Dec. 26, 2016

(86) PCT No.: PCT/KR2016/015276
§ 371 (c)(1),
(2) Date: Aug. 2, 2018

(87) PCT Pub. No.: WO2017/135573
PCT Pub. Date: Aug. 10, 2017

(65) Prior Publication Data
US 2019/0045456 A1   Feb. 7, 2019

Related U.S. Application Data
(60) Provisional application No. 62/290,409, filed on Feb. 2, 2016.

(51) Int. Cl.
*H04W 74/00* (2009.01)
*H04W 52/30* (2009.01)
(Continued)

(52) U.S. Cl.
CPC ............. *H04W 52/30* (2013.01); *H04W 4/40* (2018.02); *H04W 52/367* (2013.01);
(Continued)

(58) Field of Classification Search
CPC ............. H04W 52/146; H04W 52/365; H04W 52/325; H04W 52/242; H04W 72/0446;
(Continued)

(56) References Cited

U.S. PATENT DOCUMENTS

2013/0176953 A1* 7/2013 Stern-Berkowitz ......................... H04W 52/146
370/329

FOREIGN PATENT DOCUMENTS

| KR | 1020140133463 | 11/2014 |
| KR | 1020150109970 | 10/2015 |
| WO | 2012177218 | 12/2012 |

OTHER PUBLICATIONS

PCT International Application No. PCT/KR2016/015276, Written Opinion of the International Searching Authority dated Apr. 21, 2017, 14 pages.
(Continued)

*Primary Examiner* — Tu X Nguyen
(74) *Attorney, Agent, or Firm* — Lee, Hong, Degerman, Kang & Waimey

(57) ABSTRACT

A user equipment for performing multi-RAT concurrent transmission according to an embodiment of the present invention receives, from a base station, information on subframe sets and power management parameters to be applied to each of the subframe sets, sets the maximum transmission power of each of a first RAT signal and a second RAT signal using the power management parameters, and transmits at least one of the first RAT signal and the second RAT signal based on the set maximum transmis-
(Continued)

sion power. The subframe sets may include a first subframe set in which only transmission of the first RAT signal is allowed and a second subframe set in which multi-RAT concurrent transmission is allowed, and the power management parameters may include a parameter for limiting the maximum transmission power of the second RAT signal to be transmitted concurrently with the first RAT signal in the second subframe set.

13 Claims, 13 Drawing Sheets

(51) Int. Cl.
*H04W 52/38* (2009.01)
*H04W 72/04* (2009.01)
*H04W 88/06* (2009.01)
*H04W 4/40* (2018.01)
*H04W 52/36* (2009.01)

(52) U.S. Cl.
CPC ........... *H04W 52/38* (2013.01); *H04W 72/04* (2013.01); *H04W 72/0473* (2013.01); *H04W 88/06* (2013.01)

(58) Field of Classification Search
CPC ........... H04W 72/0473; H04W 52/243; H04W 52/346; H04W 72/14; H04W 52/241; H04W 16/14; H04W 72/12; H04W 52/08; H04W 52/143; H04W 52/10
USPC ......................................... 455/522, 68, 115.3
See application file for complete search history.

(56) References Cited

OTHER PUBLICATIONS

3rd Generation Partnership Project (3GPP), "Technical Specification Group Radio Access Network; Evolved Universal Terrestrial Radio Access (E-UTRA); User Equipment (UE) radio transmission and reception (Release 13)," 3GPP TS 36.101 V13.2.1, Jan. 2016, 250 pages.
Ericsson, et al., "P-MPR and the upper limit of Pcmax", 3GPP TSG RAN WG4 Meeting #60bis, R4-115032, Aug. 2011, 6 pages.
European Patent Office Application Serial No. 16889550.6, Search Report dated Jul. 23, 2019, 10 pages.
Qualcomm Incorporated, "Types of TDM Solutions for LTE ISM Coexistence," 3GPP TSG-RAN WG2 #71-BIS, R2-105764, XP002783410, Oct. 2010, 7 pages.
Intel Corporation, "TDM Solutions for In-Device Coexistence," 3GPP TSG-RAN WG2 #71-BIS, R2-105666, KP050452677, Oct. 2010, 4 pages.
TeliaSonera, Deutsche Telekom, "P-MPR Definition," 3GPP TSG-RAN WG4 #61, R4-115576, XP050567039, Nov. 2011, 2 pages.
Intel Corporation, "On RRM of LTE-WLAN aggregation and interworking," 3GPP TSG-RAN WG4 #76bis, R4-155632, KP051008808, Oct. 2015, 5 pages.
LG Electronics, et al., "New WI proposal: Support for V2V services based on LTE sidelink," 3GPP TSG-RAN #70, RP-152293, XP051656628, Dec. 2015, 8 pages.

\* cited by examiner

FIG. 2
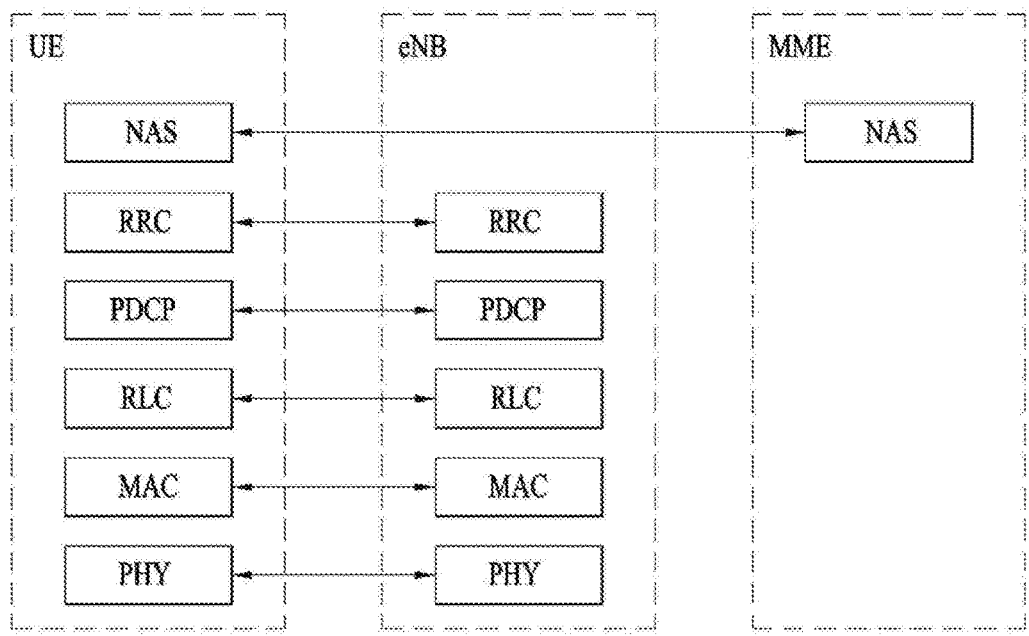
(a) CONTROL-PLANE PROTOCOL STACK
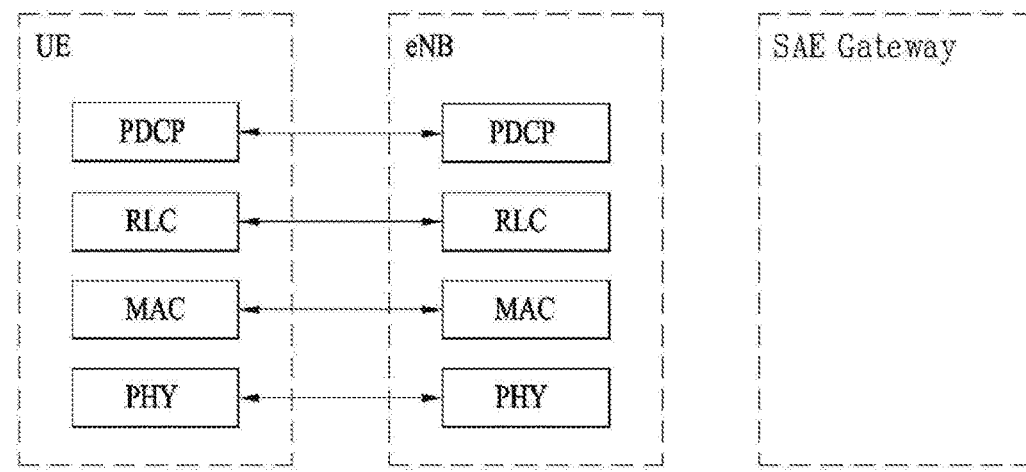
(b) USER-PLANE PROTOCOL STACK (a) in coverage    (b) out-of-coverage    (c) partial coverage

METHOD FOR TRANSMITTING SIGNAL ON BASIS OF MULTI-RADIO ACCESS TECHNOLOGY IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/015276, filed on Dec. 26, 2016, which claims the benefit of U.S. Provisional Application No. 62/290,409, filed on Feb. 2, 2016, the contents of which are all hereby incorporated by reference herein in their entirety.

TECHNICAL FIELD

The present invention relates to a wireless communication system, and more particularly, to a method of transmitting multi-radio access technology (RAT) signals at the same time and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method for a user equipment to efficiently perform multi-RAT simultaneous transmission in a wireless communication system and an apparatus therefor.

The present invention is not limited to the above technical problems and other technical objects may be inferred from embodiments of the present invention.

Technical Solution

To achieve these and other advantages and in accordance with the purpose of the present invention, as embodied and broadly described, according to one embodiment, a method of performing multi-radio access technology (RAT) simultaneous transmission by a user equipment (UE) in a wireless communication system, includes receiving information on a plurality of subframe sets and a plurality of power management parameters to be applied to each of the plurality of subframe sets from a first RAT base station, configuring maximum transmit power of a first RAT signal and maximum transmit power of a second RAT signal using the plurality of power management parameters, and transmitting at least one of the first RAT signal and the second RAT signal based on the configured maximum transmit power. In this case, the plurality of subframe sets include a first subframe set in which transmission of the first RAT signal is allowed only and a second subframe set in which multi-RAT simultaneous transmission is allowed and the plurality of power management parameters can include a parameter for limiting the maximum transmit power of the second RAT signal to be simultaneously transmitted with the first RAT signal in the second subframe set.

To further achieve these and other advantages and in accordance with the purpose of the present invention, according to a different embodiment, a user equipment (UE) performing multi-radio access technology (RAT) simultaneous transmission in a wireless communication system includes a receiver configured to receive information on a plurality of subframe sets and a plurality of power management parameters to be applied to each of the plurality of subframe sets from a first RAT base station, a processor configured to set maximum transmit power of a first RAT signal and maximum transmit power of a second RAT signal using the plurality of power management parameters, and a transmitter configured to transmit at least one of the first RAT signal and the second RAT signal based on the set maximum transmit power. In this case, the plurality of subframe sets include a first subframe set in which transmission of the first RAT signal is allowed only and a second subframe set in which multi-RAT simultaneous transmission is allowed and the plurality of power management parameters can include a parameter for limiting the maximum transmit power of the second RAT signal to be simultaneously transmitted with the first RAT signal in the second subframe set.

A plurality of the power management parameters can include a first power management-maximum power reduction (P-MPR) value for the first subframe set and a second P-MPR value for the second subframe set.

The UE may limit the maximum transmit power of the second RAT signal to be simultaneously transmitted with the first RAT signal in the second subframe set based on the second P-MPR.

The UE determines third P-MPR for the second subframe set, selects a smaller one from among the second P-MPR and the third P-MPR, and can apply the selected P-MPR to the second subframe set.

The UE may determine the lower bound of the maximum transmit power of the first RAT signal by selecting the smaller one from among the second P-MPR and the third P-MPR.

The first P-MPR for the first subframe set in which transmission of the second RAT signal is not allowed can be configured by 0 dB.

When transmit power required by a specific signal among the first RAT signal and the second RAT signal to be transmitted in the second subframe set, exceeds maximum transmit power set to the specific signal, the UE can drop a remaining signal except the specific signal.

The UE can report, to the first RAT base station, a list of heterogeneous RATs supported by the UE in addition to the first RAT.

The first RAT corresponds to a long term evolution (LTE)-based cellular network and the second RAT may correspond to a dedicated short range communication (DSRC)/wireless access for vehicular environment (WAVE)-based vehicle to everything (V2X) network.

Advantageous Effects

According to one embodiment of the present invention, if a time domain restriction and a power domain restriction for performing multi-RAT simultaneous transmission of a user equipment are applied by a hybrid scheme, it is able to have scheduling flexibility between multi RATs and minimize a coverage decreasing problem due to power distribution which occurs when the multi-RAT simultaneous transmission is performed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an E-UTRAN based on the 3GPP radio access network specification;

MODE FOR INVENTION

Figure 1:
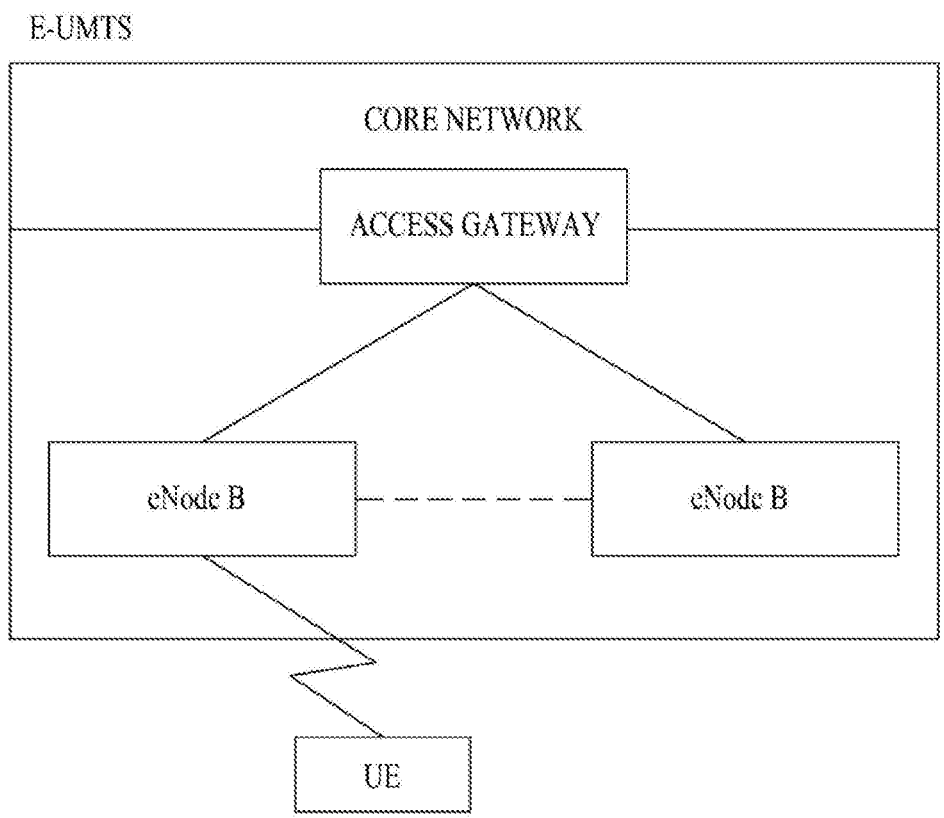
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
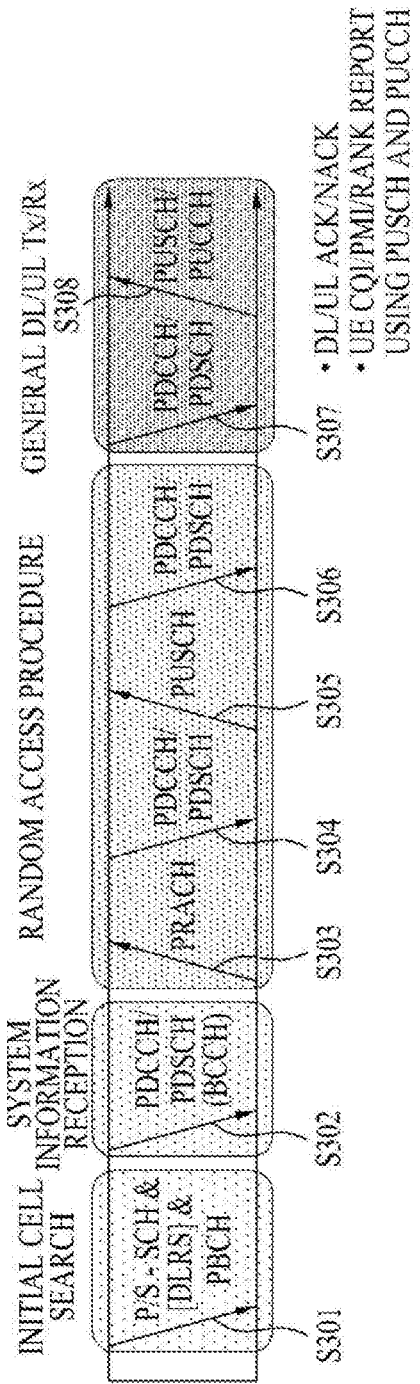
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
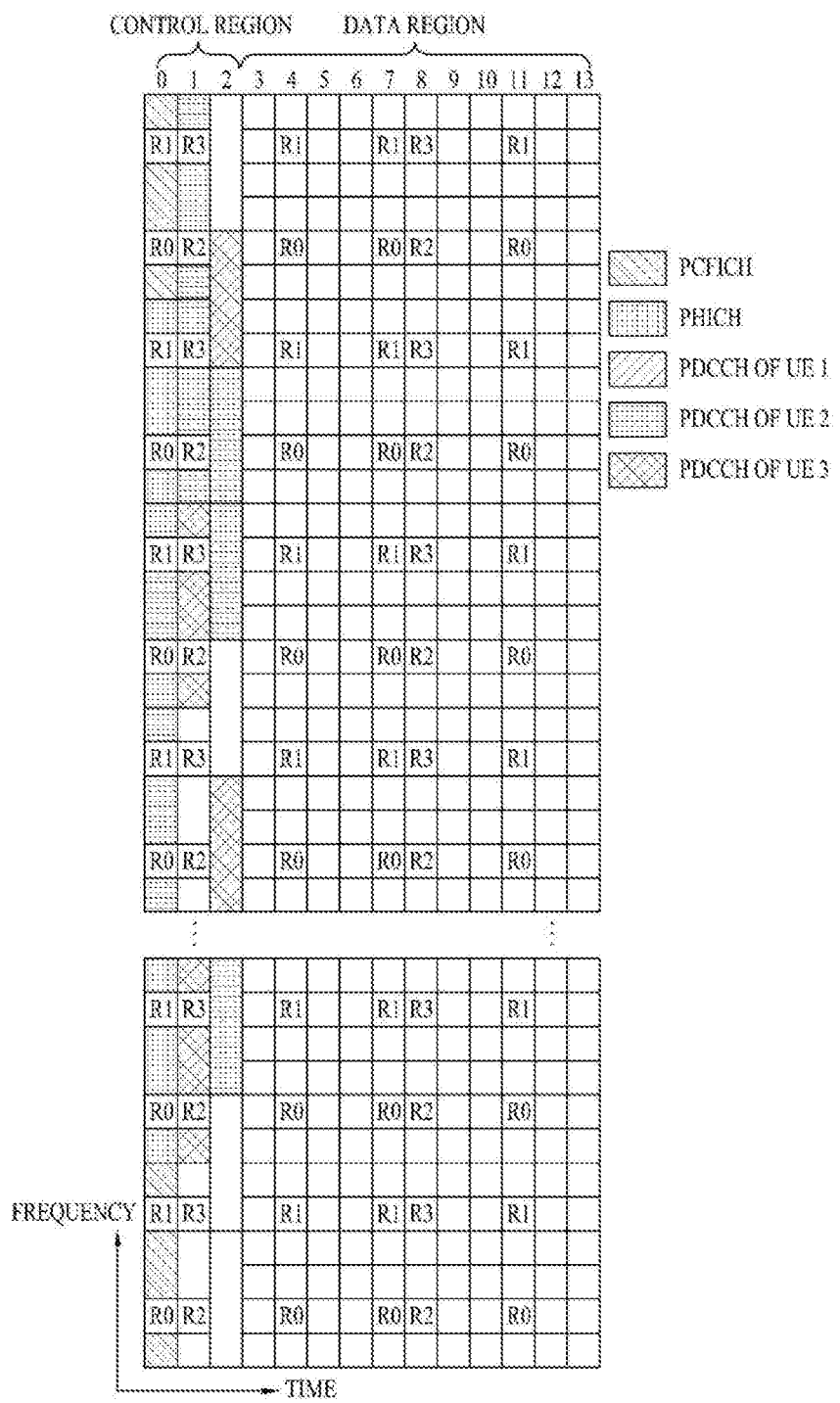
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
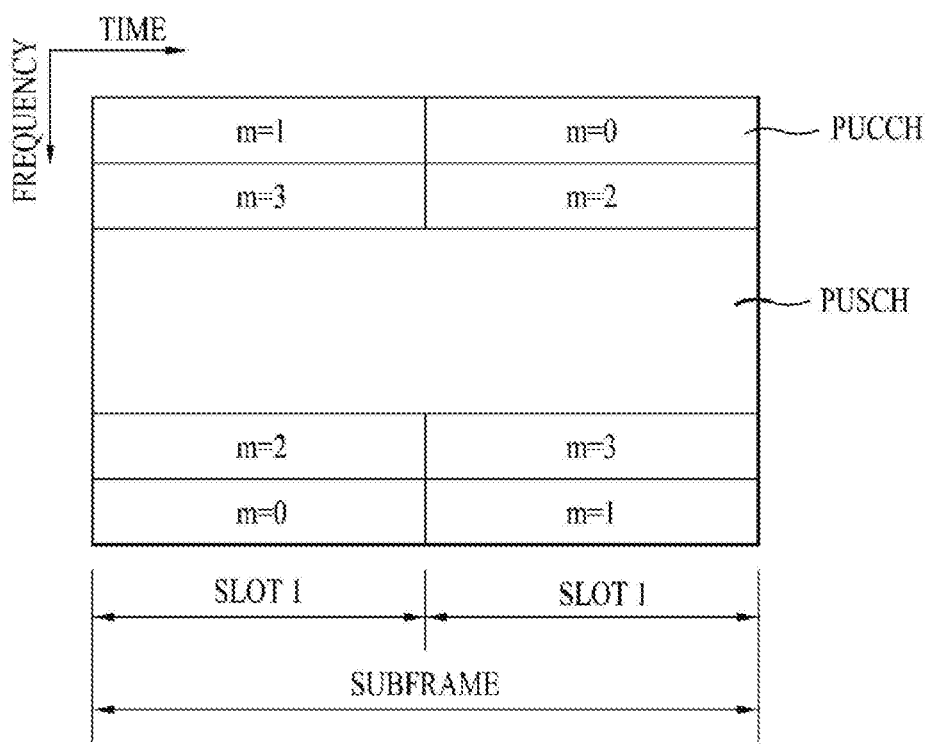
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
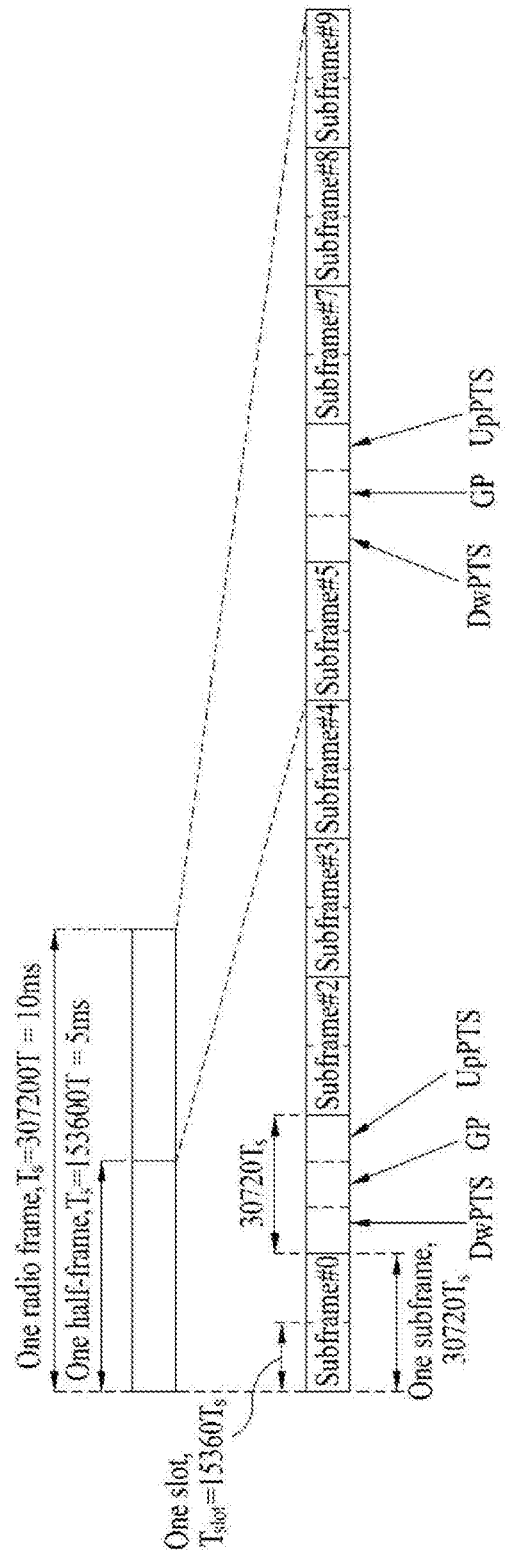
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
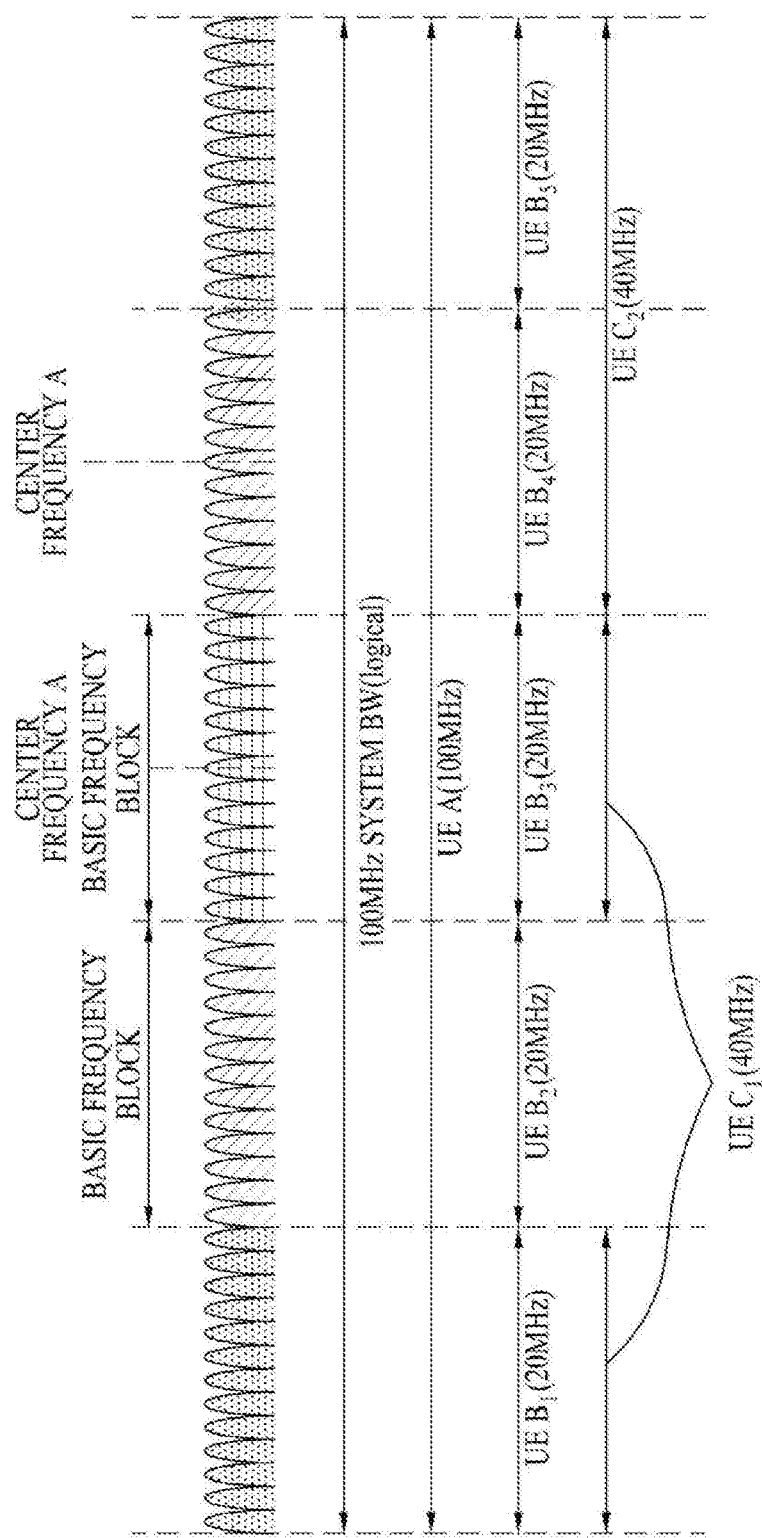
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
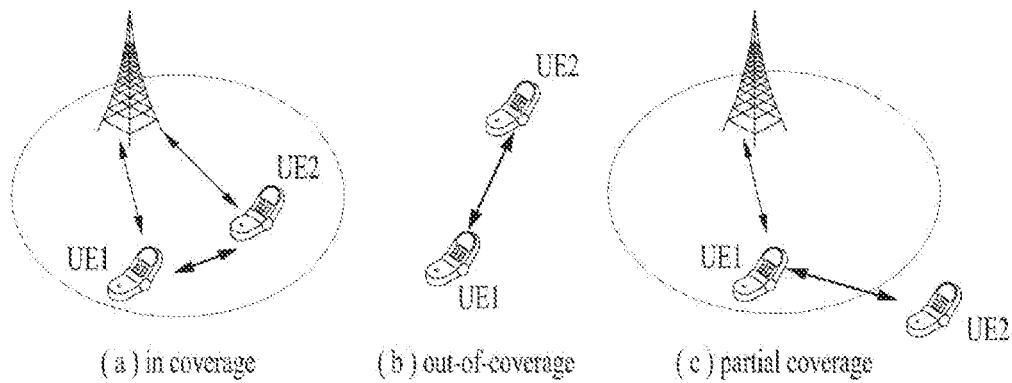
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)= P_{O\_PRE} \Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe i-$K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [db] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}$+$\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUSCH}$ [dB] |
|---|---|
| 0 | −1 |
| 1 | 0 |
| 2 | 1 |
| 3 | 3 |

TABLE 6

| TPC Command Field in DCI format 3A | $\delta_{PUSCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\begin{Bmatrix} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{Bmatrix} [dBm]$$ [Equation 4]

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8}$$ [Equation 5]

where, $n_{SRS}^{cs}$ a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases}$$ [Equation 6]

where, $k_0$ denotes a frequency domain start point of an SRS and is defined by Equation 7.

$$k_0 = k_0' + \sum_{b=0}^{B_{SRS}} 2M_{sc,b}^{RS} n_b$$ [Equation 7]

where, $n_b$ denotes a frequency location index. $k_0'$ for a general uplink subframe is defined by Equation 8 and $k_0'$ for an uplink pilot time is defined by Equation 9.

$$k_0' = (\lfloor N_{RB}^{UL}/2 \rfloor - m_{SRS,0}/2)N_{SC}^{RB} + k_{TC}$$ [Equation 8]

$$k_0' = \begin{cases} (N_{RB}^{UL} - m_{SRS,0}^{max})N_{sc}^{RB} + k_{TC} & \text{if} \begin{pmatrix} (n_f \bmod 2) \times \\ (2 - N_{SP}) + n_{hf} \end{pmatrix} \bmod 2 = 0 \\ k_{TC} & \text{otherwise} \end{cases}$$ [Equation 9]

In Equations 8 and 9, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2$$ [Equation 10]

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b$$ [Equation 11]

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$ [Equation 12]

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \\ \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$ [Equation 13]

where, $n_{SRS}$ is a parameter used to calculate the number of times of transmitting the SRS and is defined by Equation 14.

[Equation 14]

$$n_{SRS} = \begin{cases} 2N_{SP}n_f + 2(N_{SP}-1)\lfloor \frac{n_s}{10} \rfloor + \\ \lfloor \frac{T_{offset}}{T_{offset\_max}} \rfloor \end{cases}, for\,2ms\,SRS\,periodicity\,of\,TDD\,framestructur \\ \lfloor (n_f \times 10 + \lfloor n_s/2 \rfloor)/T_{SRS} \rfloor, \quad otherwise$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

following in a FDD system or a TDD system where $T_{SRS}$ is greater than 2 ($T_{SRS}>2$). Yet, in Equation 15, $k_{SRS}$ corresponds to $\{0, 1, \ldots, 9\}$ in case of the FDD system, whereas k SRS is determined according to Table 9 in the following in case of the TDD system.

$$(10 \cdot n_f + k_{SRS} - T_{offset})\,\text{mod}\,T_{SRS} = 0 \quad \text{[Equation 15]}$$

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset})\,\text{mod}\,5 = 0 \quad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Meanwhile, in case of the periodic SRS, transmission is performed in a subframe satisfying Equation 15 in the

TABLE 10

| SRS Configuration Index $I_{SRS}$ | SRS Periodicity $T_{SRS,\,1}$ (ms) | SRS Subframe Offset $T_{offset,\,1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 11

| SRS Configuration Index $I_{SRS}$ | SRS Periodicity $T_{SRS,\,1}$ (ms) | SRS Subframe Offset $T_{offset,\,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |

TABLE 11-continued

| SRS Configuration Index $I_{SRS}$ | SRS Periodicity $T_{SRS, 1}$ (ms) | SRS Subframe Offset $T_{offset, 1}$ |
|---|---|---|
| 10-14 | 5 | $I_{SRS}$ − 10 |
| 15-24 | 10 | $I_{SRS}$ − 15 |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}$>2) in the Table 11. Equation 18 in the following is used for a TDD system of which $T_{SRS}$ is equal to 2 ($T_{SRS}$=2) in the Table 11. Yet, in case of the FDD system, $k_{SRS}$ corresponds to {0, 1, . . . , 9}. In case of the TDD system, $k_{SRS}$ is determined according to the Table 9.

$$(10 \cdot n_f + k_{SRS} - T_{offset,1}) \bmod T_{SRS,1} = 0 \qquad \text{[Equation 17]}$$

$$(k_{SRS} - T_{offset,1}) \bmod 5 = 0 \qquad \text{[Equation 18]}$$

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
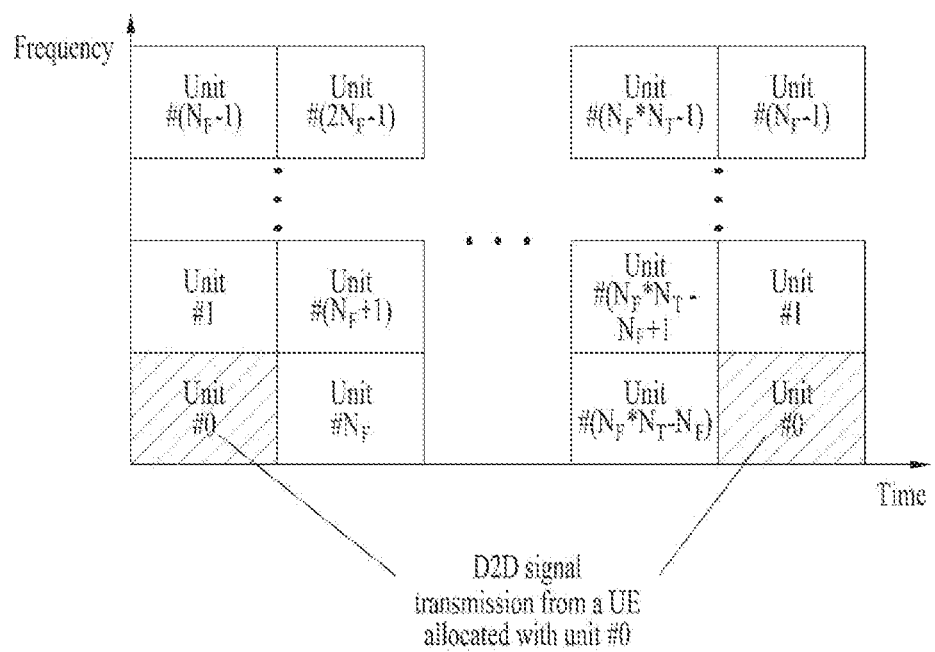
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
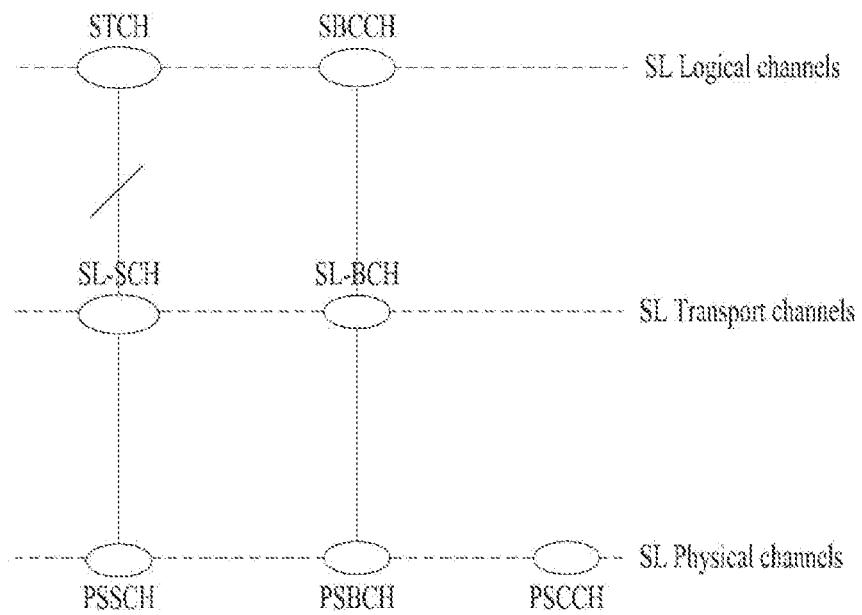
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
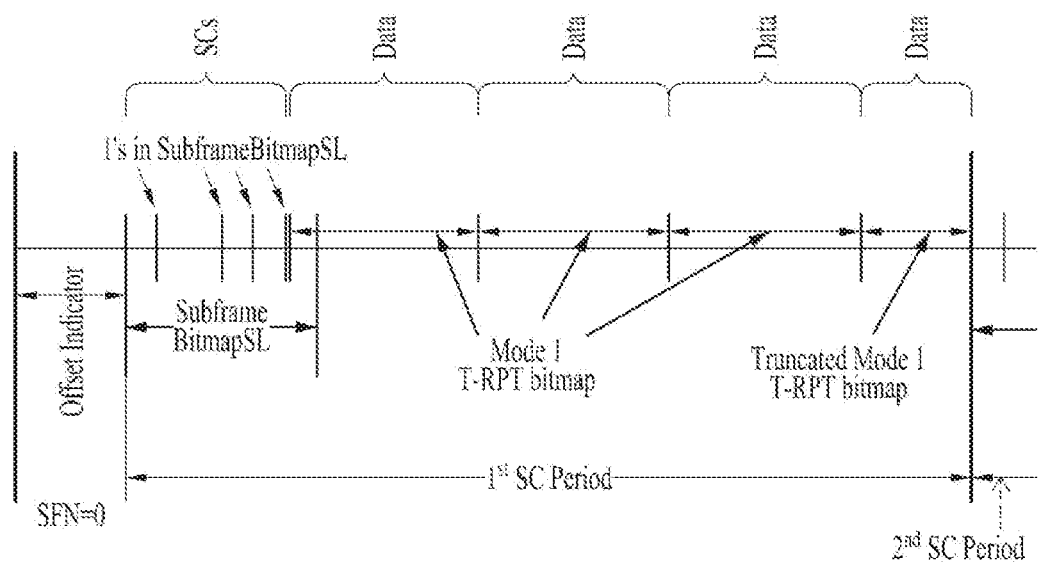
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

Resource Scheduling for Multi-RAT Interworking

Currently, study on vehicle to everything (V2X) is in progress in 3GPP standardization. The V2X, for example, includes LTE-based V2X services such as V2V (vehicle-to-vehicle), V2P (vehicle-to-pedestrian), V2I/N (vehicle-to-infrastructure/network), and the like.

Figure 12:
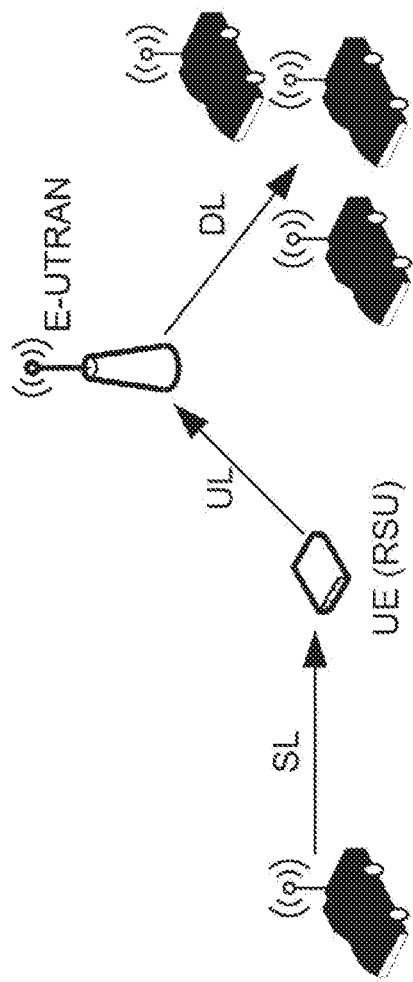
FIG. 12 illustrates environment with which D2D and WAN are combined.

FIG. 12 illustrates V2X environment. Specifically, FIG. 12 illustrates an example of a service provided via a combination of D2D and WAN (wide area network) among V2X scenarios.

If such an event as a car accident occurs, a user equipment (UE) transmits a message notifying the occurrence of the event to neighboring UEs. Having received the message, an RSU (road side unit) forwards the message to a network using cellular-based communication (e.g., LTE uplink). The network can disseminate the message to neighboring UEs using cellular-based communication (e.g., LTE downlink).

In FIG. 12, SL corresponds to the aforementioned sidelink. A part of WAN uplink resources can be defined as an SL resource in advance or can be used for SL usage via network signaling.

Meanwhile, although FIG. 12 illustrates that the SL transmits a message based on LTE D2D, the SL can be replaced with a link for a D2D communication technique of a different scheme (e.g., RAT different from LTE D2D). The replacement of the SL link can be usefully utilized when resources allocated for LTE D2D usage are not sufficient or when a collision between D2D UEs is to be avoided.

Meanwhile, in order to support simultaneous transmission of radio access technology (RAT) signals different from each other, it is necessary to consider the maximum output power according to a power class of a UE transmitting the RAT signals. For example, assume a case that a UE of which the maximum output power corresponds to 23 dBm transmits a DSRC (dedicated short-range communication) signal with power of 23 dBm. Since the UE uses all of the maximum output power to transmit the DSRC signal, the UE is unable to transmit an LTE signal while the DSRC signal is transmitted. In particular, when there is no separate restriction on a resource use of RAT signals different from each other, if one RAT signal is transmitted, it is difficult to transmit another RAT signal.

In order to solve the problem above, one embodiment of the present invention proposes a resource allocation scheme and a scheduling scheme to perform interworking between LTE system and a heterogeneous RAT. For example, the heterogeneous RAT may correspond to DSRC/WAVE (wireless access in vehicular environments). The WAVE corresponds to a wireless communication specification standardized in IEEE 802.11P and IEEE P1609 based on DSRC specification of the United States.

For clarity, DSRC, which has been developed for ITS (intelligent transport system), is described as the heterogeneous RAT. However, the present invention is not restricted to interworking between LTE and DSRC. The present invention can also be applied to interworking between LTE system and a further different RAT.

In the following description, for clarity, assume that a cellular network basically operates based on LTE. A different RAT rather than LTE-based RAT is referred to as a heterogeneous RAT.

Proposal 1: Time Domain Restriction

It may be able to define a time domain restriction condition for interworking between LTE RAT and heterogeneous RAT.

As a method for a UE to perform inter-RAT interworking, it may consider that a network (e.g., LTE network) signals a set of resources for each RAT operation. For example, a base station can signal a time resource (e.g., a set of subframes) capable of performing a DSRC operation or a heterogeneous RAT operation in a cell to which the base station belongs thereto. This can be comprehended as an operation of separating RAT operations different from each other in time domain.

For more efficient scheduling, a UE can report not only information on LTE system but also information on RATs capable of being operated/accessed by the UE (e.g., a list of RATs) to a base station. The base station determines a resource (e.g., a set of subframes) for each RAT based on the report of the UE and can signal the resource to the UE.

For example, the base station can transmit a grant (e.g., UL/DL transmission scheduling DCI) for LTE operation to UEs not performing a DSRC operation in a resource allocated for the DSRC. Or, the base station can be scheduled to receive an uplink signal from the UEs not performing DSRC operation in a resource allocated for the DSRC.

Meanwhile, in the proposal 1, if a power restriction is not applied to a heterogeneous RAT, it is able to guarantee coverage of a heterogeneous RAT signal. Yet, scheduling flexibility of LTE operation and a heterogeneous RAT operation can be reduced due to a restriction condition in time domain. Resource efficiency can be reduced according to a signaling interval of a subframe set.

Proposal 2: Power Domain Restriction

It may be able to define a power domain restriction condition for interworking between LTE RAT and heterogeneous RAT.

For example, in order to support multi-RAT operation of a UE, a network (e.g., LTE network) determines a maximum value (or a minimum value) of signal transmit power of LTE (or heterogeneous RAT) and can signal the value to the UE. In this case, maximum transmit power (or minimum transmit power) can be configured to be applied to a simultaneous transmission situation of multi-RAT signals.

In this case, the maximum transmit power determined by the network should be distinguished from a parameter $P_{EMAX,c}$ defined in a legacy 3GPP LTE specification. The parameter $P_{EMAX,c}$ of the legacy 3GPP LTE specification corresponds to a parameter for limiting the transmit power of a UE for a serving cell 'c'. The parameter is set to the UE via RRC signaling. When carrier aggregation is supported to a UE, the parameter $P_{EMAX,c}$ can be configured according to a serving cell. The parameter $P_{EMAX,c}$ can be used for determining maximum transmit power ($P_{cmax,c}$) of a UE for a serving cell 'c'. The maximum transmit power ($P_{cmax,c}$) of the UE is configured not to exceed the parameter $P_{EMAX,c}$.

When maximum transmit power of LTE is configured in consideration of a heterogeneous RAT, it can be comprehended as maximum transmit power for a heterogeneous RAT signal is restricted within the network coverage. In other word, when maximum transmit power of LTE is configured in consideration of a heterogeneous RAT, it can be replaced with the restriction on maximum transmit power for a heterogeneous RAT signal.

If transmission of LTE and transmission of heterogeneous RAT are restricted in power domain only, simultaneous transmission of LTE and heterogeneous RAT may not be restricted in time domain. In particular, if a UE/network determines transmit/receive power within a given power limit according to RAT, it is able to perform simultaneous transmission of multi-RAT.

Meanwhile, a restriction condition for transmit power may decrease the coverage of a signal. For example, when a UE intends to disseminate a signal for an emergency situation as far as possible using a heterogeneous RAT (e.g., DSRC), the UE may fail to secure the coverage as much as the UE wants due to the restriction of the transmit power set to heterogeneous RAT. In particular, when such a specific event as an emergency situation occurs, it may be able to ease the restriction of the transmit power set to the heterogeneous RAT or prohibit transmission to LTE RAT to secure the coverage of the heterogeneous RAT.

Power restriction for multi-RAT interworking can be considered when actual maximum transmit power is determined.

First of all, a procedure for configuring maximum transmit power ($P_{cmax,c}$) of a UE defined in legacy 3GPP LTE specification is explained.

A UE can autonomously configure maximum transmit power ($P_{cmax,c}$) of the UE for a serving cell c. In his case, the maximum transmit power ($P_{cmax,c}$) should satisfy the upper limit and the lowest limit of equation 19.

$$P_{CMA\_L,c} \leq P_{CMAX,c} \leq P_{CMAX\_H,c} \quad \text{[Equation 19]}$$

In equation 19, the lowest limit ($P_{CMAX\_L,c}$) of the maximum transmit power and the upper limit ($P_{CMAX\_H,c}$) of the maximum transmit power can be defined as equation 20 and equation 21, respectively.

$$P_{CMAX\_L,c} = \text{MIN}\{P_{EMAX,c} - \Delta T_{C,c}, P_{PowerClass} - \text{MAX}(MPR_c + A - MPR_c + \Delta T_{IB,c} + \Delta T_{C,c} + \Delta T_{Prose}, P - MPR_c)\} \quad \text{[Equation 20]}$$

$$P_{CMAX\_H,c} = \text{MIN}\{P_{EMAX,c}, P_{PowerClass}\} \quad \text{[Equation 21]}$$

In equations 20 and 21, as mentioned in the foregoing description, '$P_{EMAX,C}$' corresponds to a parameter set to a UE by a base station via RRC signaling. '$P_{PowerClass}$' corresponds to maximum UE power according to a power class without considering tolerance. '$MPR_c$' and 'A-$MPR_c$' correspond to maximum power reduction and additional power reduction, respectively, for a serving cell c. '$\Delta T_{IB,c}$' corresponds to additional tolerance for the serving cell c. '$\Delta T_{C,c}$' corresponds to a value configured by 1.5 dB or 0 dB. If a UE supports ProSe (proximity based service) Direct Discovery/Communication, '$\Delta T_{ProSe}$' is configured by 0.1 dB. If the UE does not support the ProSe (proximity based service) Direct Discovery/Communication, the 'A $T_{ProSe}$' is configured by 0 dB. 'P-$MPR_c$' corresponds to allowed maximum power reduction.

A UE autonomously determines the 'P-MPR$_c$' in consideration of simultaneous transmission, proximity detection, or the like in performing multi-RAT. The UE reports a value of the 'P-MPR$_c$' to a base station and the base station can schedule the UE in consideration of the value of the 'P-MPR$_c$'.

LTE UE can determine maximum output power (P$_{CMAX,c}$) of the LTE UE in consideration of maximum power, a power class, MPR (Maximum Power Reduction), A-MPR (Additional-Maximum Power Reduction), P-MPR (Power management-Maximum Power Reduction), and tolerance signaled by a network.

According to one embodiment of the present invention, it may be able to use the P-MPR of equation 20 as a method of applying the proposal 2.

For example, a base station can set a value of the P-MPR (or a maximum value of the P-MPR) to a UE. In order to distinguish a parameter 'P-MPRc' of equation 20 determined by the UE from a P-MPR configured by a network, the P-MPR value signaled by the network is represented by 'P-MPRe'. In particular, when the base station signals the P-MPRe value, it can be comprehended as the base station limits the maximum transmit power of a heterogeneous RAT signal.

Having received the P-MPRe value from the network, the UE may regard the P-MPRe as the maximum value of the P-MPRc. For example, the UE determines a P-MPRc value equal to or less than the P-MPRe value received from the network as a value to be actually used by the UE and can determine maximum transmit power (P$_{CMAX,c}$) for an LTE serving cell c using the actual P-MPRc value determined by the UE. In this case, the UE can report transmit power of the heterogeneous RAT signal determined by the UE to the network to make the transmit power of the heterogeneous RAT signal to be reflected to the scheduling of LTE signal.

This is a method for limiting the transmit power of the heterogeneous RAT signal. This can be comprehended as a network signaling parameter (e.g., P-MPRe) is newly defined. The base station can signal a new parameter (P-MPRe) to the UE.

Meanwhile, if the new parameter P-MPRe is introduced to equation 20, the equation 20 can be modified into equation 22.

$$P_{CMAX\_L,c} = \text{MIN}[P_{EMAX,c} - \Delta T_{C,c}, P_{PowerClass} - \text{MAX}\{MPR_c + A\text{-}MPR_c + \Delta T_{IB,c} + \Delta T_{C,c}, \Delta T_{ProSe}, \text{MIN}(P\text{-}MPR_c, P\text{-}MPR_e)\}] \quad \text{[Equation 22]}$$

Meanwhile, similar to a method of limiting the maximum transmit power for a heterogeneous RAT signal via P-MPRe, it may use a method of limiting the maximum transmit power for an LTE signal. For example, it may be able to newly define a parameter P$_{EMAX,RAT}$ for limiting the maximum transmit power for the LTE signal. The base station can signal the parameter P$_{EMAX,RAT}$ to the UE. The UE determines the maximum transmit power for a serving cell c not to exceed a value of the parameter P$_{EMAX,RAT}$.

And, if parameter P$_{EMAX,RAT}$ is reflected to equation 21, the equation 21 can be modified into equation 23.

$$P_{CMAX\_H,c} = \text{MIN}\{P_{EMAX,RAT}, P_{EMAX,c}, P_{PowerClass}\} \quad \text{[Equation 23]}$$

Or, the parameter P$_{EMAX,c}$ signaled by the network can be defined to be comprehended as a value considering output power of a heterogeneous RAT signal as well. For example, the base station determines the parameter P$_{EMAX,c}$ in consideration of the output power of the heterogeneous RAT signal and may be then able to signal the parameter to the UE. Specifically, referring to equation 23, the base station determines P$_{EMAX,c}$ capable of satisfying P$_{EMAX,c} \le$ P$_{EMAX,RAT}$ instead of separately signaling the P$_{EMAX,RAT}$ to the UE and may be able to signal the determined P$_{EMAX,c}$ to the UE. In this case, the UE calculates P$_{CMAX\_H,c}$ using a method identical to the legacy equation 21.

The UE can determine P$_{CMAX\_L,c}$/P$_{CMAX\_H,c}$/P$_{CMAX,c}$ via equation 22/equation 23 only when multi-RAT signals are simultaneously transmitted. For example, when the UE transmits an LTE signal only, the UE can determine the P$_{CMAX\_L,c}$/P$_{CMAX\_H,c}$/P$_{CMAX,c}$ via equation 20/equation 21.

When a network receives an uplink signal from a UE, the network can determine transmit power of an LTE signal and transmit power of a heterogeneous RAT signal of each UE based on minimum uplink transmit power capable of guaranteeing reception quality. The minimum uplink transmit power capable of guaranteeing reception quality can be determined based on a measurement result of an SRS transmitted by the UE.

Meanwhile, the power restriction using the P-MPR can be similarly applied to uplink carrier aggregation. The total maximum transmit power P$_{CMAX}$ applied to the uplink carrier aggregation case can be derived from adding up all maximum transmit power value (P$_{CMAX,c}$) per cell. It is able to perform power restriction by putting the newly defined parameter (e.g., P$_{EMAX,RAT}$, P-MPR$_e$) into an equation for obtaining the maximum transmit power.

Proposal 3: Combination of Time Domain & Power Domain Restrictions

According to the proposal 1, if the maximum power identical to the legacy maximum power is used, it is able to guarantee the coverage of each RAT. On the other hand, scheduling flexibility can be reduced due to the restriction on time domain. According to the proposal 2, although it is able to guarantee scheduling flexibility, it may fail to guarantee the coverage of each RAT when multi-RAT simultaneous transmission is performed.

Hence, one embodiment of the present invention proposes a hybrid scheme that the time domain restriction of the proposal 1 is combined with the power domain restriction of the proposal 2.

For example, a network can signal sets of a plurality of time resources (e.g., subframe sets) to a UE. And, the network can signal a power restriction to be applied to each of the subframe sets to the UE. The power restriction to be applied to each subframe set may follow the aforementioned proposal 2, by which the present invention may be non-limited.

Specifically, the network can signal a subframe set 1 and a subframe set 2 to the UE. And, the network can signal a first P-MPRe value to be applied to the subframe set 1 and a second P-MPRe value to be applied to the subframe set 2 to the UE. The first P-MPRe value and the second P-MPRe value can be independently determined. For example, if the network signals the first P-MPRe value (=0 dB) to the subframe set 1 and signals the second P-MPRe value (=3 dB) to the subframe set 2, it can be comprehended as transmission of heterogeneous RAT is not allowed in the subframe set 1 and the transmission of the heterogeneous RAT is allowed in the subframe set 2 until power identical to power of LTE. In particular, transmission of an LTE signal is allowed only in the subframe set 1 and simultaneous transmission of an LTE signal and a heterogeneous RAT signal is allowed in the subframe set 2. If the second P-MPRe value is configured by 3 dB, the maximum transmit power allowed to the LTE signal and the maximum transmit power allowed to the heterogeneous RAT signal are identically configured in the subframe set 2. The network can adaptively control the second P-MPRe value in accordance with a wireless channel status.

In the example above, although a case of signaling two subframe sets and two P-MPRe values has been described, the present invention is not restricted to the case.

For example, in order to support the coverage of a heterogeneous RAT signal in various ways, it may be able to set 3 or more subframe sets and 3 or more P-MPRe to a UE. For example, transmission of a heterogeneous RAT signal is configured not to be allowed in a first subframe set, the maximum transmit power permitted to a heterogeneous RAT signal is restricted (e.g., first coverage) to M dBm in a subframe set 2, and the maximum transmit power permitted to a heterogeneous RAT signal can be restricted (e.g., second coverage) to N dBm in a subframe set 3.

If two or more heterogeneous RATs are additionally supported as well as LTE, it may set 3 or more subframe sets and 3 or more P-MPRe values to a UE. For example, For example, transmission of a heterogeneous RAT signal is configured not to be allowed in a first subframe set, simultaneous transmission of an LTE signal and a signal of heterogeneous RAT 1 is allowed in a subframe set 2, and simultaneous transmission of an LTE signal and a signal of heterogeneous RAT 2 can be allowed in a subframe set 3. In addition, it is able to configure a subframe set and a P-MPRe value to simultaneously transmit the signal of the heterogeneous RAT 1 and the signal of the heterogeneous RAT 2. And, it is able to configure a subframe set and a P-MPRe value to simultaneously transmit an LTE signal and signals of a plurality of heterogeneous RATs.

In the example above, although it is assumed that a P-MPRe parameter is signaled to set a power restriction according to a subframe set, this is just an example for clarity. A different power restriction scheme and a parameter mentioned earlier in the proposal 2 can be applied as well.

Although it is assumed that time domain restriction is applied in a unit of a subframe as a time resource, the present invention is not restricted to the unit. For example, it may use a unit of a different time resource such as an OFDM symbol, a slot, a frame, or the like.

Additionally, if the maximum transmit power for an LTE/heterogeneous RAT signal is finally determined via the proposal 2, a UE can report the determined maximum transmit power to a network. And, if the maximum transmit power for an LTE/heterogeneous RAT signal according to a subframe set is finally determined via the proposal 3, the UE can report the determined maximum transmit power to the network. A base station can schedule an LTE signal based on the report of the UE.

And, a priority can be defined between signals different from each other. When a UE transmits a signal of a high priority or a signal of transmit power equal to or higher than a prescribed level, a signal belonging to a different RAT can be dropped to secure the coverage of the signal of the high priority.

For example, if a network requires uplink transmit power greater than a predefined/pre-signaled uplink transmit power level to a UE via a UL grant (e.g., DCI scheduling UL transmission), the UE can drop transmission of a heterogeneous RAT signal in a subframe (or subframe set) in which UL transmission is performed in response to the UL grant.

Or, if contents of a message forwarded via a heterogeneous RAT signal such as DSRC, or the like has a priority equal to or higher than a prescribed level (e.g., dissemination of car accident contents, etc.), a UE drops transmission of an LTE signal and may be then able to assign additional power to the heterogeneous RAT signal. If additional power is assigned to the heterogeneous RAT signal, a UE can transmit the heterogeneous RAT signal with transmit power greater than the maximum transmit power of the heterogeneous RAT signal configured according to the aforementioned proposal.

If power of an LTE signal is reduced to a level equal to or lower than a prescribed level (e.g., a predefined power level or a power level signaled by a network) due to power assigned to a heterogeneous RAT signal (e.g., DSRC signal), a UE can drop transmission of the heterogeneous RAT signal. This is a case that a higher priority is assigned to the LTE signal. Of course, the heterogeneous RAT signal may have a priority higher than a priority assigned to the LTE signal.

In particular, if the UE drops a signal, the UE can report information on signal dropping to the network. For example, if the UE drops an LTE signal to transmit a heterogeneous RAT signal, the UE can report information on the dropping of transmission/reception of the LTE signal to the network. Subsequently, in order to transmit an LTE UL signal, the UE may receive allocation of a resource from the network or receive an LTE DL signal from the network again. On the other hand, if the UE drops a heterogeneous RAT signal to transmit/receive an LTE signal, the UE can report information on the dropping of the heterogeneous RAT signal to the network. Subsequently, the UE may receive allocation of a resource for transmitting the heterogeneous RAT signal from the network. For example, the network can indicate a time resource for transmitting the dropped heterogeneous RAT signal to the UE. The network may not schedule transmission/reception of an LTE signal in a time resource in which a heterogeneous RAT signal is transmitted by the UE.

Figure 13:
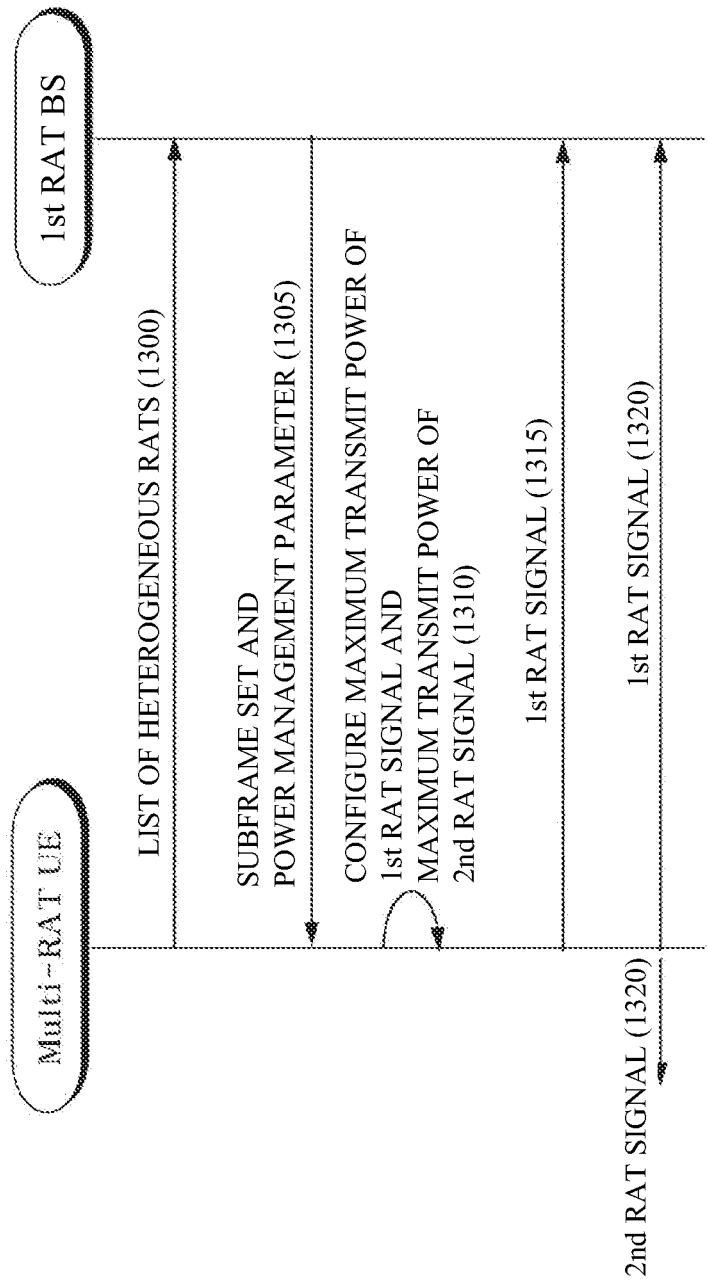
FIG. 13 is a flowchart illustrating a method of performing multi-RAT transmission according to one embodiment of the present invention.

FIG. 13 is a flowchart illustrating a method of performing multi-RAT transmission according to one embodiment of the present invention. Explanation on contents overlapped with the aforementioned description can be omitted.

In FIG. 13, assume that a UE corresponds to a multi-RAT UE supporting multi-RAT simultaneous transmission and a base station operates based on the first RAT. For clarity, FIG. 13 illustrates two RATs (first RAT and second RAT). However, the number of multiple RATs can be changed in various ways. And, assume that the first RAT corresponds to a long term evolution (LTE)-based cellular network and the second RAT corresponds to a dedicated short range communication (DSRC)/wireless access for vehicular environment (WAVE)-based vehicle to everything (V2X) network.

Referring to FIG. 13, a UE reports, to the first RAT base station, a list of heterogeneous RATs supported by a UE in addition to the first RAT [1300].

The UE receives information on a plurality of subframe sets and a plurality of power management parameters to be applied to each of the plurality of subframe sets from the first RAT base station [1305].

The UE can configure maximum transmit power of the first RAT signal and maximum transmit power of the second RAT signal using the plurality of power management parameters [1310].

A plurality of the subframe sets can include the first subframe set in which transmission of the first RAT signal is allowed only and the second subframe set in which simultaneous transmission of multi-RAT is allowed.

A plurality of the power management parameters can include a parameter for limiting maximum transmit power of the second RAT signal to be simultaneously transmitted with the first RAT signal in the second subframe set. For example, the plurality of power management parameters can include a first power management-maximum power reduction (P-MPR) value for the first subframe set and a second P-MPR value for the second subframe set. In particular, the first RAT base station signals the parameter P-MPR$_e$ mentioned earlier in equation 22 to the UE. In this case, a P-MPR$_e$ for the first subframe set and a P-MPR$_e$ for the second subframe set can be signaled to the UE.

The UE may limit the maximum transmit power of the second RAT signal to be simultaneously transmitted with the first RAT signal in the second subframe set based on the second P-MPR. And, the UE can determine third P-MPR (e.g., P-MPR$_c$ in equation 22) for the second subframe set. The UE selects a smaller one from among the second P-MPR and the third P-MPR and can apply the selected P-MPR to the second subframe set. For example, the UE selects a smaller one from among the second P-MPR and the third P-MPR to determine the lower limit (e.g., $P_{CMAX\_L,c}$ in equation 22) of the maximum transmit power of the first RAT signal.

The first P-MPR for the first subframe set in which transmission of the second RAT signal is not allowed can be configured by 0 dB.

The UE transmits at least one of the first RAT signal and the second RAT signal based on the configured maximum transmit power. For example, the UE transmits the first RAT signal only in a subframe belonging to the first subframe set [1315]. The UE can simultaneously transmit the first RAT signal and the second RAT signal (i.e., multi-RAT simultaneous transmission) in a subframe belonging to the second subframe set [1320].

Meanwhile, maximum transmit power of the first RAT signal applied to the first subframe set may be different from maximum transmit power of the first RAT signal applied to the second subframe set. For example, the maximum transmit power of the first RAT signal applied to the first subframe set is determined based on equations 20 and 21. On the other hand, the maximum transmit power of the first RAT signal applied to the second subframe set can be determined based on equation 22 and/or 23.

Meanwhile, when the first RAT signal and the second RAT signal are transmitted in the second subframe set, if transmit power required by a specific signal among the first RAT signal and the second RAT signal exceeds maximum transmit power set to the specific signal, the UE can drop the remaining signal except the specific signal.

Figure 14:
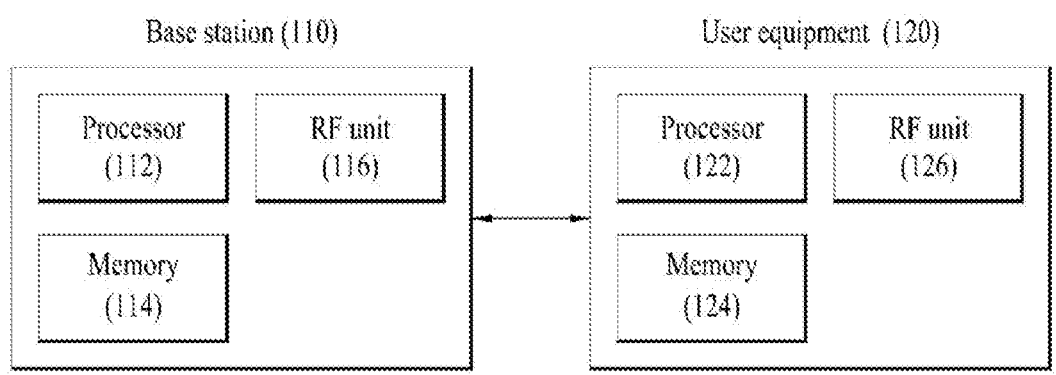
FIG. 14 is a view illustrating a user equipment (UE) and a base station (BS) according to an embodiment of the present invention.

FIG. 14 is a view illustrating a user equipment (UE) and a base station (BS) according to an embodiment of the present invention. The BS and UE illustrated in FIG. 14 may perform signal transmitting/receiving operations according to aforementioned embodiments.

Referring to FIG. 14, a wireless communication system includes a BS 110 and a UE 120. In downlink, a transmitter may be a part of the BS 110, and a receiver may be a part of the UE 120. In uplink, a transmitter may be a part of the UE 120, and a receiver may be a part of the BS 110. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122.

The RF unit 126 is connected to the processor 122 and transmits and/or receives RF signals. The BS 110 and/or the UE 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various wireless communication systems such as the 3GPP wireless communication system.

What is claimed is:

1. A method of performing multi-radio access technology (RAT) simultaneous transmission by a user equipment (UE) in a wireless communication system, the method comprising:
   receiving, from a first RAT base station, information on a plurality of subframe sets and a plurality of power management parameters to be applied to each of the plurality of subframe sets;
   configuring maximum transmit power of a first RAT signal and maximum transmit power of a second RAT signal using the plurality of power management parameters; and
   transmitting at least one of the first RAT signal or the second RAT signal based on the configured maximum transmit power,
   wherein the plurality of subframe sets contain a first subframe set in which transmission of the first RAT signal is allowed only and a second subframe set in which multi-RAT simultaneous transmission is allowed,
   wherein the plurality of power management parameters contain a parameter for limiting the maximum transmit power of the second RAT signal to be simultaneously transmitted with the first RAT signal in the second subframe set, and
   wherein when transmit power required by a specific signal among the first RAT signal and the second RAT signal to be transmitted in the second subframe set, exceeds maximum transmit power set to the specific signal, the UE drops a remaining signal except the specific signal.

2. The method of claim 1,
   wherein the plurality of power management parameters contain a first power management-maximum power reduction (P-MPR) value for the first subframe set and a second P-MPR value for the second subframe set, and
   wherein the UE limits the maximum transmit power of the second RAT signal to be simultaneously transmitted with the first RAT signal in the second subframe set based on the second P-MPR value.

3. The method of claim 2, wherein configuring the maximum transmit power comprises:
   determining a third P-MPR value for the second subframe set;
   selecting a smaller one from among the second P-MPR value and the third P-MPR value; and
   applying the selected P-MPR value to the second subframe set.

4. The method of claim 3, wherein the UE determines a lower bound of the maximum transmit power of the first RAT signal by selecting the smaller one from among the second P-MPR value and the third P-MPR value.

5. The method of claim 2, wherein the first P-MPR value for the first subframe set in which transmission of the second RAT signal is not allowed is configured by 0 dB.

6. The method of claim 1, further comprising:
   reporting, to the first RAT base station, a list of heterogeneous RATs supported by the UE in addition to the first RAT.

7. The method of claim 1,
   wherein the first RAT corresponds to a long term evolution (LTE)-based cellular network, and
   wherein the second RAT corresponds to a dedicated short range communication (DSRC)/wireless access for vehicular environment (WAVE)-based vehicle to everything (V2X) network.

8. A user equipment (UE) performing multi-radio access technology (RAT) simultaneous transmission in a wireless communication system, the UE comprising:
   a receiver configured to receive information on a plurality of subframe sets and a plurality of power management parameters to be applied to each of the plurality of subframe sets from a first RAT base station;
   a processor configured to set maximum transmit power of a first RAT signal and maximum transmit power of a second RAT signal using the plurality of power management parameters; and
   a transmitter configured to transmit at least one of the first RAT signal or the second RAT signal based on the set maximum transmit power,
   wherein the plurality of subframe sets contain a first subframe set in which transmission of the first RAT signal is allowed only and a second subframe set in which multi-RAT simultaneous transmission is allowed,
   wherein the plurality of power management parameters contain a parameter for limiting the maximum transmit power of the second RAT signal to be simultaneously transmitted with the first RAT signal in the second subframe set, and
   wherein when transmit power required by a specific signal among the first RAT signal and the second RAT signal to be transmitted in the second subframe set, exceeds maximum transmit power set to the specific signal, the processor is configured to drop a remaining signal except the specific signal.

9. The UE of claim 8,
   wherein the plurality of power management parameters contain a first power management-maximum power reduction (P-MPR) value for the first subframe set and a second P-MPR value for the second subframe set, and
   wherein the processor is configured to limit the maximum transmit power of the second RAT signal to be simultaneously transmitted with the first RAT signal in the second subframe set based on the second P-MPR value.

10. The UE of claim 9, wherein the processor is configured to determine a third P-MPR for the second subframe set, select a smaller one from among the second P-MPR value and the third P-MPR value, and apply the selected P-MPR value to the second subframe set.

11. The UE of claim 10, wherein the processor is configured to determine a lower bound of the maximum transmit power of the first RAT signal by selecting the smaller one from among the second P-MPR value and the third P-MPR value.

12. The UE of claim 9, wherein the first P-MPR value for the first subframe set in which transmission of the second RAT signal is not allowed is configured by 0 dB.

13. The UE of claim 8, wherein the processor is configured to report, to the first RAT base station, a list of heterogeneous RATs supported by the UE in addition to the first RAT.

* * * * *